United States Patent [19]

Smart et al.

[11] Patent Number: 5,347,334
[45] Date of Patent: Sep. 13, 1994

[54] FILM CASSETTE WITH BAR-CODED FILM SPOOL AND PROVISION FOR FILM DOUBLE EXPOSURE PREVENTION

[75] Inventors: David C. Smart, Fairport; Stephen H. Miller, Rochester, both of N.Y.

[73] Assignee: Eastman Kodak Company, Rochester, N.Y.

[21] Appl. No.: 159,901

[22] Filed: Nov. 30, 1993

[51] Int. Cl.$^5$ ............................................. G03B 17/26
[52] U.S. Cl. ................................................... 354/275
[58] Field of Search .................... 354/275, 21; 242/71, 242/71.1

[56] References Cited

U.S. PATENT DOCUMENTS

| | | | |
|---|---|---|---|
| 4,998,123 | 3/1991 | Smart | 354/275 |
| 5,030,978 | 7/1991 | Stoneham et al. | 354/21 |
| 5,032,854 | 7/1991 | Smart et al. | 354/21 |
| 5,032,861 | 7/1991 | Pagano | 354/275 |
| 5,122,820 | 6/1992 | Pagano et al. | 354/21 |

*Primary Examiner*—Howard B. Blankenship
*Attorney, Agent, or Firm*—Francis H. Boos

[57] ABSTRACT

A photographic film cassette is provided with a radial bar coded disk having first and second arcuate segments of differing radial lengths to form a gap between the disk and a circumferential lip of the cassette housing. When the cassette is removed from a camera after the film has been fully or partially exposed, the gap is positioned so as to align with a double exposure prevention hook in the camera. During a subsequent attempt to insert the cassette into the camera, the hook enters the gap and engages the housing lip to thereby prevent complete insertion of the cassette.

4 Claims, 10 Drawing Sheets

FILM CASSETTE WITH BAR-CODED FILM SPOOL AND PROVISION FOR FILM DOUBLE EXPOSURE PREVENTION

FIELD OF THE INVENTION

The invention relates generally to the field of photography, and in particular to bar-coded film spools. More specifically, the invention relates to a film spool having a bar code symbol and provision for double exposure prevention.

BACKGROUND OF THE INVENTION

Various bar code symbols are widely used to label items for product identification or other purposes. Generally speaking, a bar code symbol consists of a sequence of light and dark regions referred to as elements or bars. These elements are typically rectangular in shape and often have a variety of possible widths. An arrangement of elements represents a character and is determined according to a set of rules and definitions typically referred to as a "code". A variety of codes such as the Universal Product Code (UPC) and Code 39 exist and provide a degree of conformity.

More specifically, codes define a set of characters wherein each character is depicted and defined by a unique arrangement of elements. To encode a desired message having a number of characters, a collection of arrangements of elements are concatenated to form a bar code symbol. Each character of the message is represented by its own corresponding group of elements.

In the field of photography, it is known for a rotatable film spool to include a coaxial disk having a bar code symbol which consists of a sequence of radially extending white and black bars or elements. For example, see commonly assigned U.S. Pat. Nos. 5,023,642, issued Jun. 11, 1991, No. 5,030,978, issued Jul. 9, 1991, and 5,032,854, issued Jul. 16, 1991. The black bars are printed in spaced relation on an otherwise white bar code label that is adhered to the spool disk. The bar code symbol that results is used to provide film-related information, such as film speed (ISO), film type, total number of film exposures available, etc.

In the disclosure of these patents, the radial bar coded disk is comprised of a data segment, consisting of alternate white and black bars, and an extended synchronizing segment consisting of an extended black segment, referred to as a quiet zone, and an optional white segment referred to as a start bar. The disk is disposed on the opposite end of the film spool from the drive end. As specifically, disclosed in the '854 patent, the bar coded disk, in addition to providing information about the film on the spool, can also be employed in conjunction with suitable control circuits in the camera to provide control of the stopping position of the spool at the end of rewind to provide a visual indication of the exposure condition of film on the spool in the film cassette in which the film spool is disposed. This is important for the case of film cassettes in which the film is normally wound entirely into the cassette since the presence or absence of an extended film leader is not available to visually distinguish between film that has not been exposed and film that has been exposed.

In commonly assigned U.S. Pat. No. 4,998,123 there is shown a mechanical arrangement for double exposure prevention (DEP) of film. With this arrangement, the camera is designed to accept a cassette inserted axially into the cassette receiving chamber ("end loading"). A pivoting hook is provided in the chamber to engage a rotatable DEP flange mounted on the drive end of the cassette. The DEP flange has a circumferential lip provided with a discontinuity portion and a beveled surface formed in the discontinuity portion. With a previously unexposed film, the discontinuity is positioned circumferentially on the cassette to be in alignment with the camera hook so that, as the cassette is inserted, the hook engages the beveled surface and pivots back allowing the cassette to be fully inserted into the camera. If the film is previously exposed, the DEP flange is positioned with the discontinuity out of alignment with the hook such that, as the cassette is inserted, the hook engages the circumferential lip on the flange and blocks further insertion of the cassette into the camera. Such an arrangement, however, requires the provision of an added component (the DEP flange) to the cassette and thereby adds to the cost to the cassette.

PROBLEM TO BE SOLVED BY THE INVENTION

It is highly desirable to provide a photographic film that is capable of cooperating with a camera mounted DEP hook that does not require the inclusion of an extra component, namely a DEP flange, that adds undesirably to the cost of the film cassette.

SUMMARY OF THE INVENTION

In accordance with the invention, therefore, there is provided a photographic film cassette which includes a light tight housing and a rotatable film spool, the spool having a radial bar coded disk mounted thereon at one end of the cassette for rotation with the spool, wherein the cassette is characterized by the housing having a circumferential lip portion at the radial bar coded disk end of the cassette for engagement with a mechanical double exposure prevention hook in the cassette receiving chamber of a camera as the cassette is loaded endwise into the camera. The cassette is further characterized by the radial bar coded disk having a first arcuate segment extending to the circumferential lip portion to inhibit engagement of the hook with the lip portion of the cassette housing when the disk is rotationally positioned to indicate that film in the cassette is unexposed and having a second arcuate segment extending part way to the lip portion to define a gap between the disk and the lip portion when the disk is rotationally positioned to indicate that at least some of the film in the cassette is exposed.

ADVANTAGEOUS EFFECT OF THE INVENTION

By locating a notched radial bar coded disk on the drive end of the film cassette in place of the previous separate DEP flange, the bar coded disk is enabled to provide the dual functions of (a) providing film data and spool parking associated with the bar code and (b) mechanical DEP protection thus saving significantly in the cost of the film cassette construction.

DETAILED DESCRIPTION OF THE INVENTION

The invention is disclosed as being embodied preferably in a film cassette. Because the basic features of a film cassette are generally known as shown in prior art U.S. Pat. No. 5,122,820, the description which follows is directed in particular to elements forming part of or cooperating directly with the invention. It is to be understood, however, that other elements not specifically shown or described may take various forms known to persons of ordinary skill in the art.

The Film Cassette—General

Figure 1:
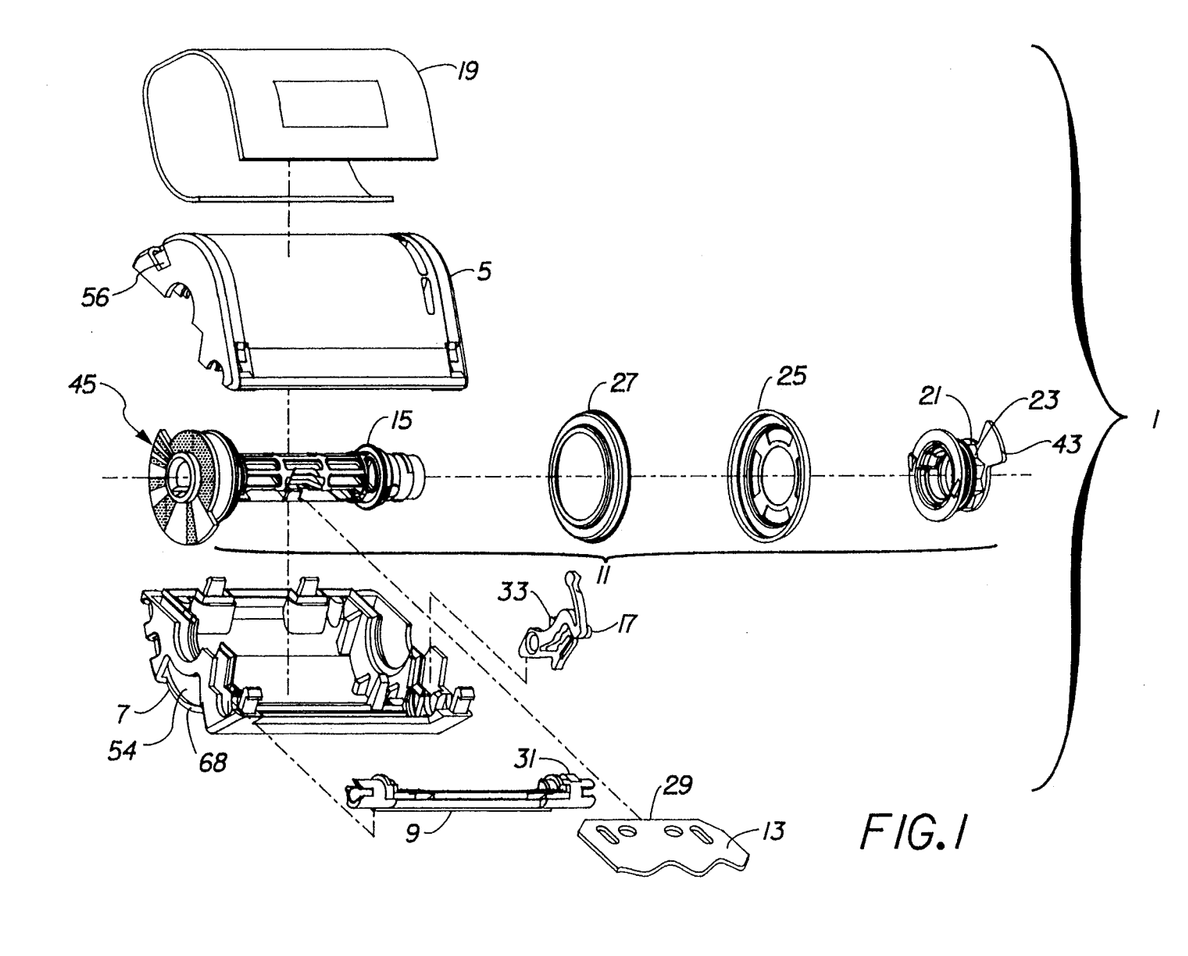
FIG. 1 is an exploded perspective view of a film cassette including a bar-coded film spool in accordance with a presently preferred embodiment of the invention.
Figure 2:
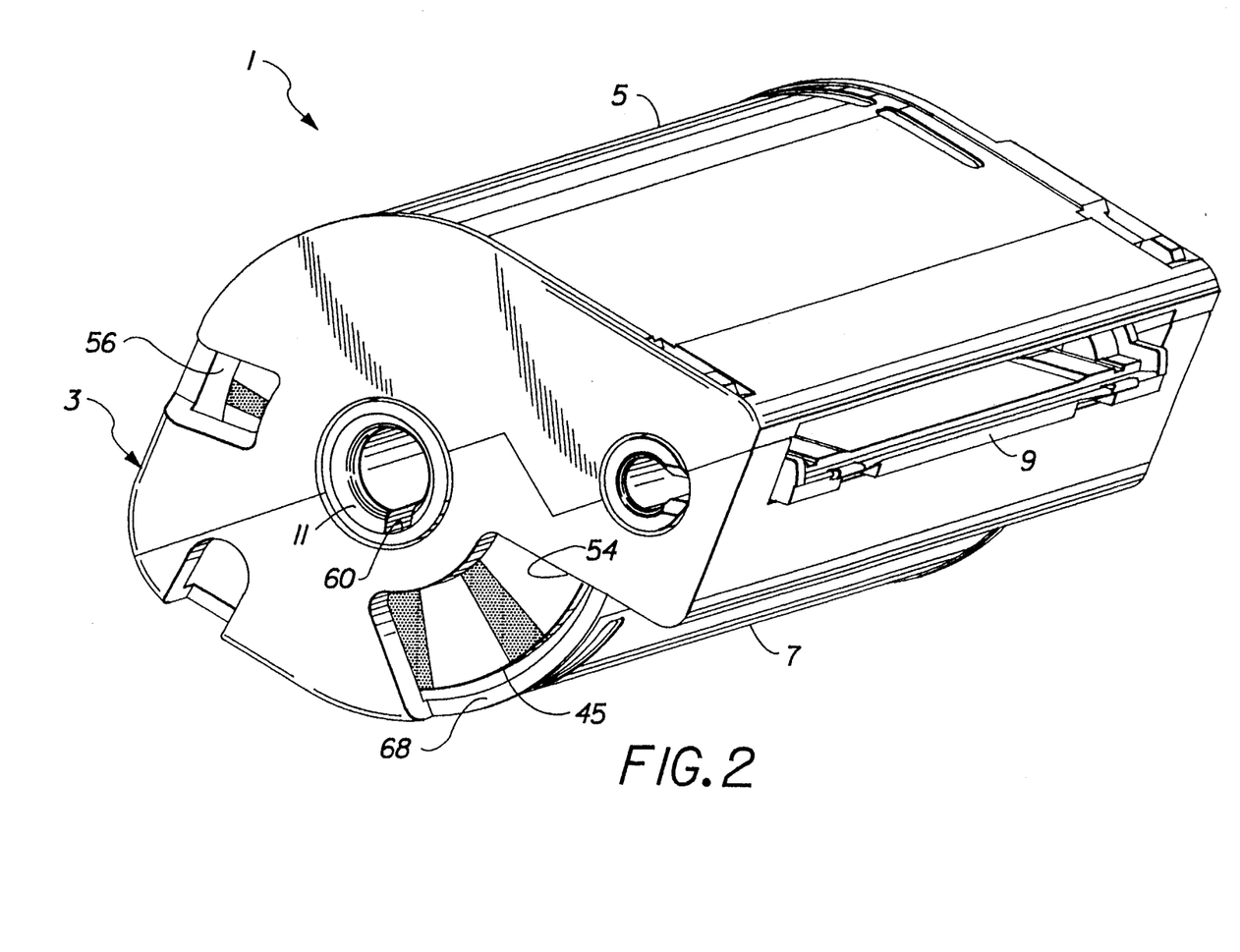
FIG. 2 is an assembled perspective view of the film cassette as seen from one end of the cassette shell.
Figure 4:
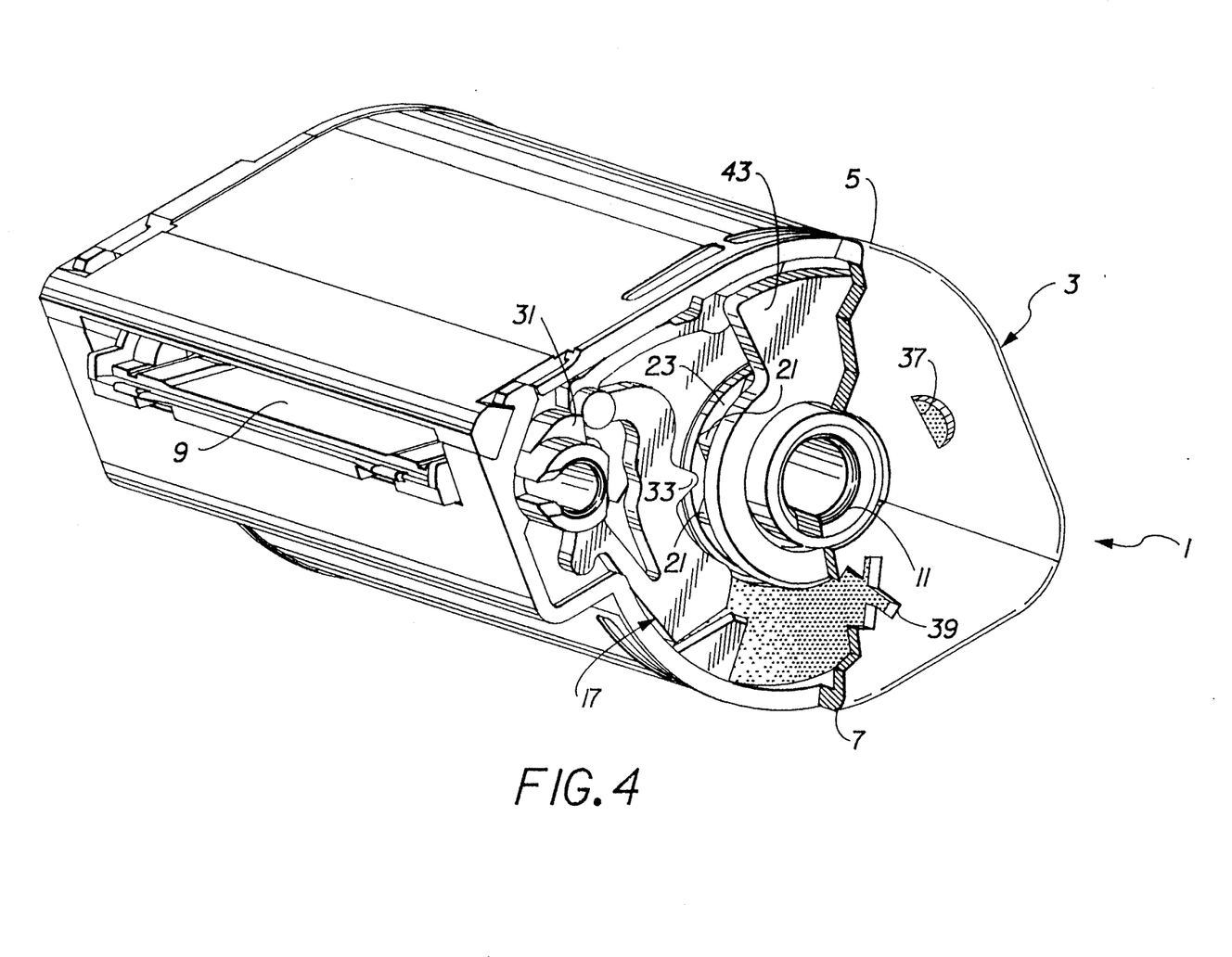
FIG. 4 is an assembled perspective view of the film cassette depicted with part of the cassette shell cut away to show a spool lock.

Referring now to the drawings, FIG. 1 is an exploded perspective view of a film cassette 1 in accordance with a preferred embodiment of the invention, and FIG. 4 is an assembled perspective view of the film cassette depicted partly cut away to show certain details of its interior. Generally, the film cassette 1 comprises a cassette shell 3 (FIG. 2) constructed of carbon-black plastic material and made up of two mating shell halves 5 and 7, a similarly constructed light-shielding door 9 closed to prevent ambient light from entering the cassette interior through a film egress/ingress slot located between the two shell halves and opened to permit film movement into and out of the cassette interior via the film egress/ingress slot, a film spool 11 supported for rotation inside the cassette shell in opposite film unwinding and film winding directions to unwind a filmstrip 13 off the spool core 15 and to wind the filmstrip onto the spool core, a spool lock 17 for engaging the spool core to prevent rotation of the film spool and out of engagement to release the film spool, and a cassette covering label 19.

Figure 5:
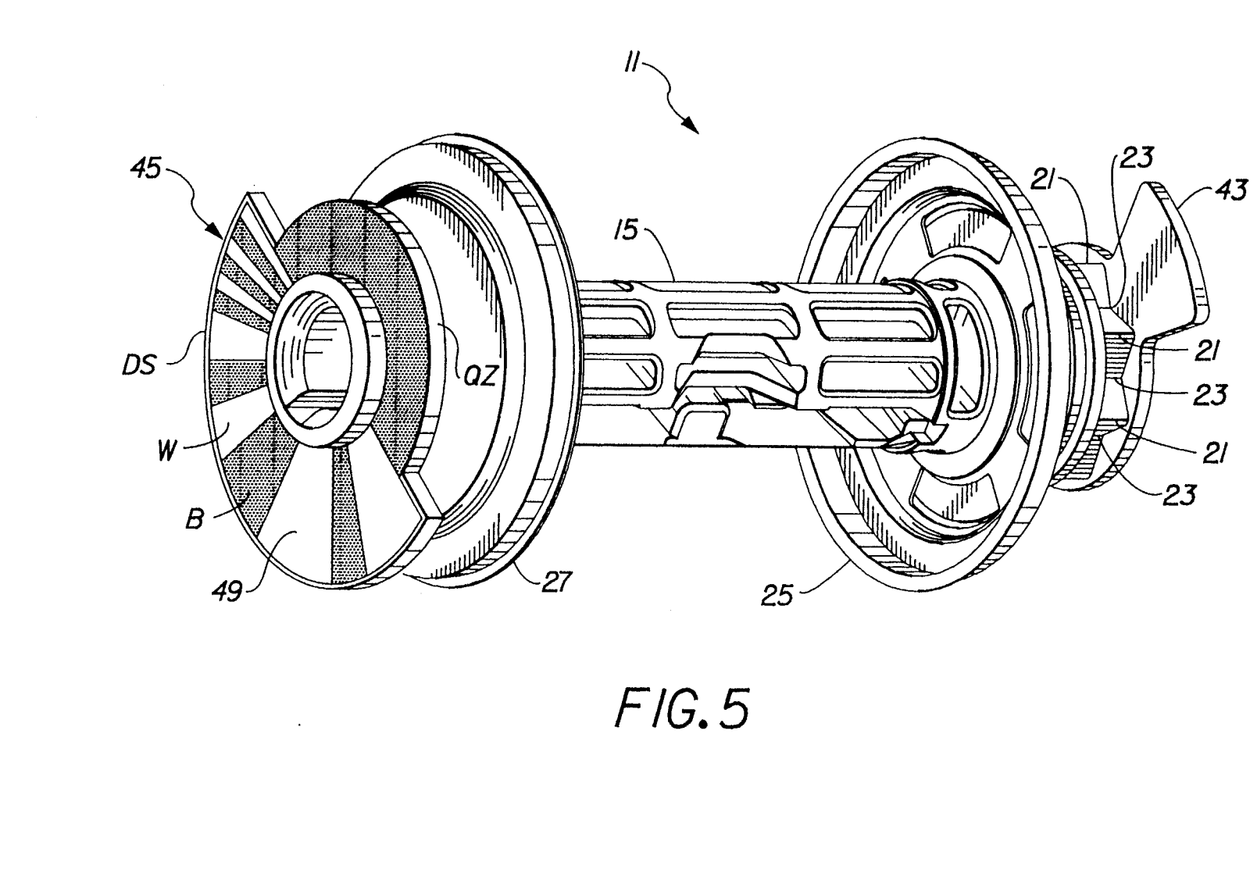
FIG. 5 an assembled perspective view of the bar-coded film spool.

The spool core 15 as shown in FIGS. 1, 4, and 5 has a toothed periphery consisting of successive symmetrical teeth 21 separated by inter dental spaces 23, and it supports a pair of coaxial flanged disks 25 and 27 between which the filmstrip 13 is stored in roll form. A trailing or inner end 29 of the filmstrip 13 is attached to the spool core 15.

The light-shielding door 9 as shown in FIGS. 1 and 4 includes integral cam means 31 for pivoting the spool lock 17 to a locking position as the door is closed. When the spool lock 17 is in its locking position, not shown, an integral detent 33 of the spool lock is located in any one of the inter dental spaces 23 between two adjacent teeth 21 of the spool core 17 to secure the film spool 11 in any one of a number of rotational orientations equal to the number of inter dental spaces. If the light-shielding door 9 is opened as shown in FIG. 4, its cam means 31 is retracted from the spool lock 17. As a result, forcible rotation of the film spool 11 in the film winding or film unwinding direction will cause one of the two adjacent teeth 21 between which the detent 33 is located to eject the detent from the inter dental space 23 separating those two teeth. Thus, the spool lock 17 will be pivoted out of its locking position.

The Film Exposure-Status Indicating Means Of The Film Cassette

Figure 3:
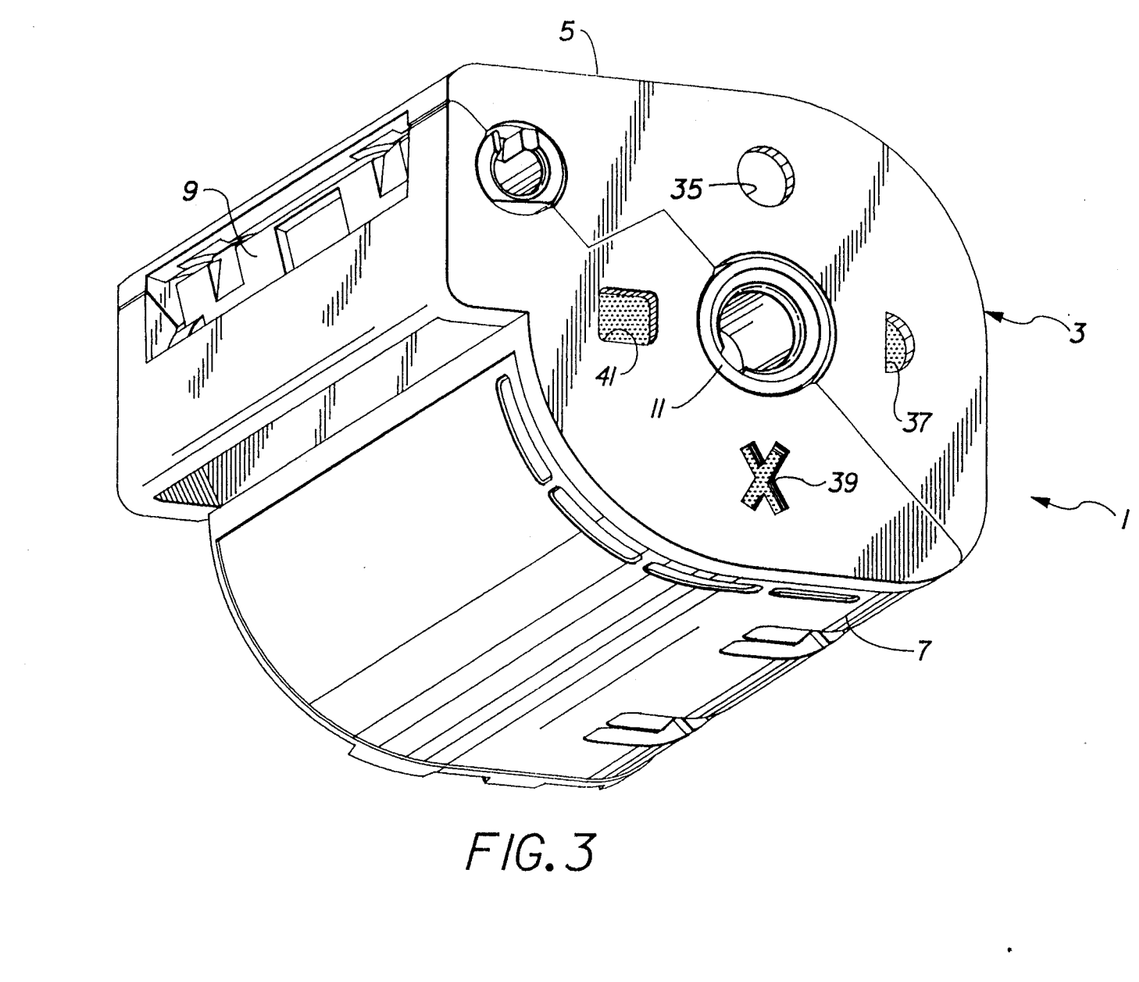
FIG. 3 is an assembled perspective view of the film cassette as seen from another end of the cassette shell.

The shell half 5 at the locking end of the spool has four icons in the form of respective cut-outs 35, 37, 39, and 41 shown in FIG. 3. The circular cut-out 35 is designed to effect an indication that the filmstrip 13 is fresh or unexposed. The semi-circular cut-out 37 is designed to effect an indication that the filmstrip 13 is partly exposed (and partly unexposed). The X-shaped cut-out 39 is designed to effect an indication that the filmstrip 13 is fully exposed while the square-shaped cut-out 41 is designed to effect an indication that the filmstrip 13 has been processed in a film processing machine to develop the latent images on the exposed film.

An indicator flag 43 is coaxially fixed to the spool core 15 at the locking end as shown in FIGS. 1 and 5, to be rotated with the film spool 11 in the film unwinding and film winding directions. Initially, the flag 43 is secured by the film manufacturer with the film spool 11 in a rotational orientation that locates the flag immediately beneath the circular cut-out 35 as shown in FIG. 3, to be visible to provide an indication that the filmstrip 13 is fresh or unexposed. Although the cassette shell is shown as being light colored for convenience of illustration, it will be appreciated that the shell and internal spool flanges are conventionally black in color. However, flag 43 is light in color. As a consequence, in an actual cassette, the internal flanges of the spool seen through cutouts 37, 39 and 41 tend to blend together with the black ends of shell halves 5 and 7 while the light colored surface of flag 43 is easily viewed through cutout 35 to indicate unexposed film. Similarly, when the flag 43 is secured with the film spool 11 in a rotational orientation that locates the flag immediately beneath the cut-out 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip 13 is fully exposed. When the flag 43 is secured with the film spool 11 in a rotational orientation that locates the flag immediately beneath the cut-out 41, it is visible to provide an indication that the filmstrip 13 has been processed.

The Bar-coded Film Spool

Figure 6:
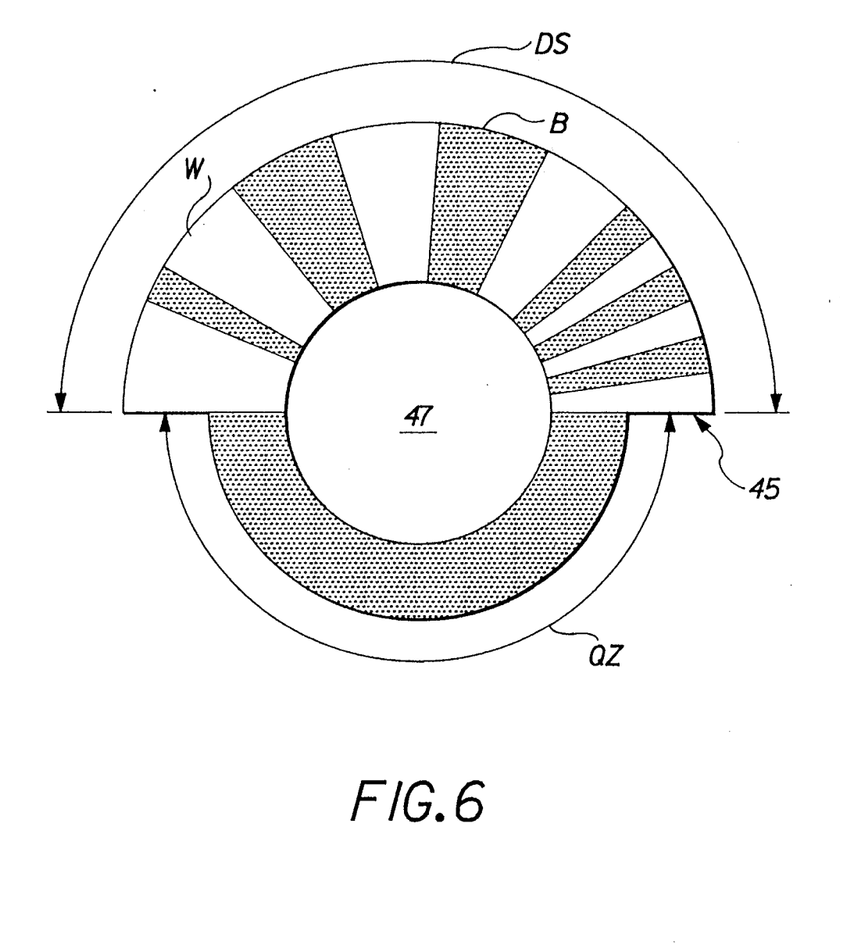
FIG. 6 is a plan view of a radial bar coded disk format according to the present invention.

According to a feature of the invention, the film spool 11, as shown in FIGS. 1, 5 and 6, includes a plastic disk 45 having a first arcuate segment DS of a first radial dimension and a second arcuate segment QZ of a second radial dimension shorter than the first radial dimension. In the illustrated embodiment, the radial bar coded disk is mounted on the spool at the drive end of the cassette. The spool core 11 extends longitudinally through the central opening 47 of the disk 45. The disk 45 may be separately formed and secured to the film spool in a peripheral groove (not shown) formed on the spool or, more preferably, the disk may be integrally formed on the spool when the spool is molded. A radial bar code providing data concerning characteristics of the film in the cassette is secured to the segment DS of the disk 45. The bar code is preferably printed in the form a semicircular label 49 which is adhesively secured to the disk 45. Since the semicircular bar coded label 49 covers only half of the disk 45, the remainder of the disk is left exposed thereby forming a black synchronizing segment QZ, typically referred to as the "quiet zone" of the disk. As previously noted, since all of the parts of the cassette and spool are black, except for the light colored flag 43, there is no significant discernible difference between the QZ segment of the disk 45 and surface of spool disk 27 insofar as detection by an opto-sensor bar code reader is concerned. At this point, it should be noted that cassette 3 is provided with openings 54, 56 at the end of the cassette which allow access for opto-sensors in the camera to sense and read the radial bar code and synchronizing segment on disk 45. Opening 54 is somewhat elongated to allow access for both an opto-sensor 64 and a DEP hook 52 as will be discussed below. When the film spool 11 with the radial bar coded disk 45 is assembled inside the cassette housing 3, the radial length of the first arcuate segment DS of disk 45 is such that the segment DS extends to an axially extending circumferential lip portion 68 (FIGS. 1 & 8) formed on the outer circumference of the cassette housing 3. The radial length of arcuate segment QZ, on the other hand, is shorter than segment DS and extends only part way to the lip portion 68 thereby defining a gap 70 between the segment QZ of disk 45 and the lip portion 68.

Camera Cassette Receiving Chamber

Figure 7:
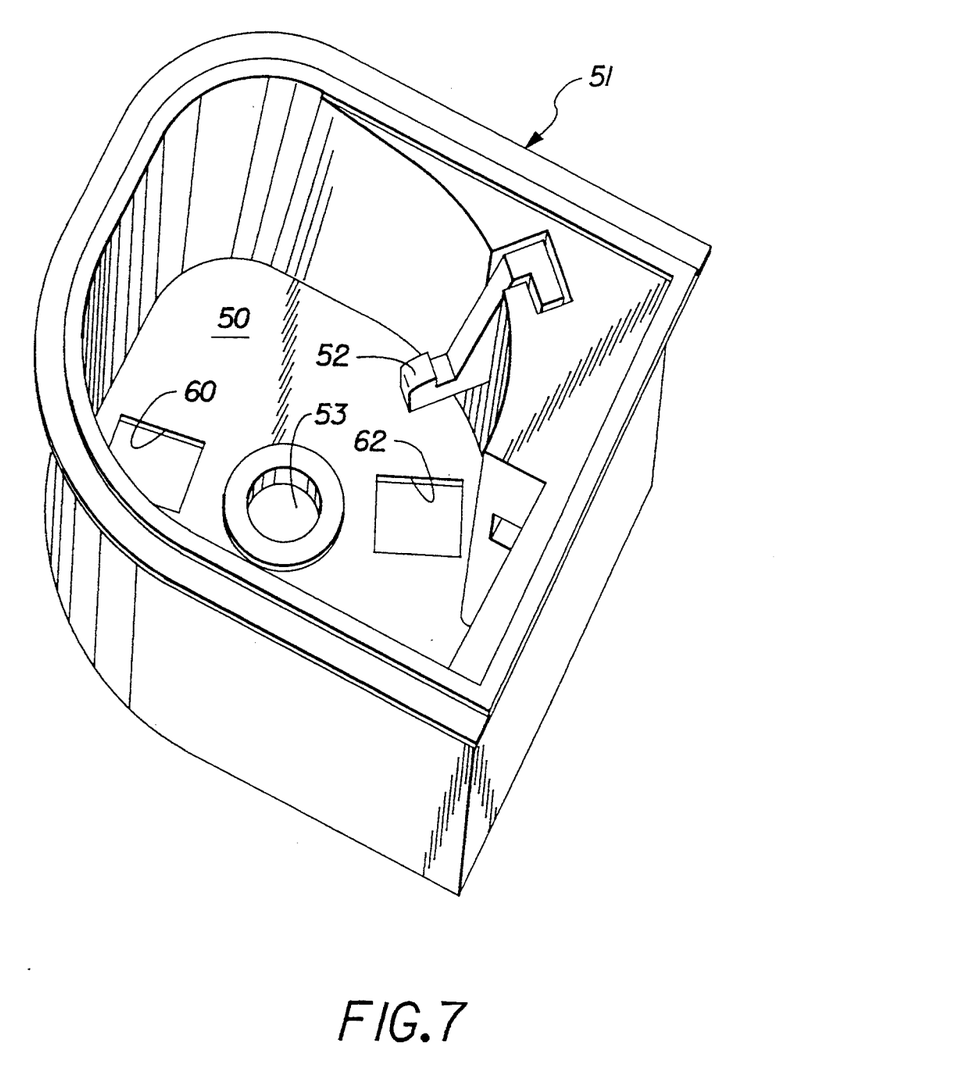
FIG. 7 is a perspective view of a portion of a camera receiving chamber embodying a DEP hook.

Referring to FIG. 7, there is shown in schematic manner a portion of a camera comprising a camera cassette receiving chamber 50 adapted for use with the cassette of the present invention includes a housing 51 defining the chamber 50. A DEP hook 52 is pivotally mounted in a side wall of the chamber. Hook 52 is positioned circumferentially in the chamber so as to cooperate with opening 54 (FIG. 1) in the end of the cassette which provides optical access by an opto-sensor to the radial bar coded disk 45. The chamber is also provided with a hinged door (not shown) to provide light tight closure of the chamber once the cassette is fully inserted therein. The far end of the chamber includes a central opening 53 coaxial with the spool core to allow access by a motorized drive to the spool core. Openings 60 and 62 are provided to allow access by opto-sensors 64 and 66 (FIGS. 9 and 10) to sense and read the bar code on label 49 and the synchronizing segment QZ.

Figure 8A:
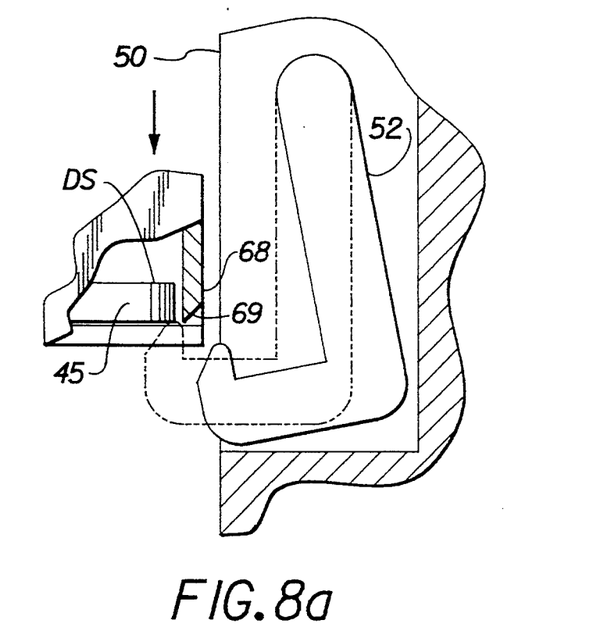
FIGS. 8a and 8b are cutaway side views of a portion of a camera cassette receiving chamber showing operation of the DEP hook with a cassette according to the present invention.
Figure 8B:
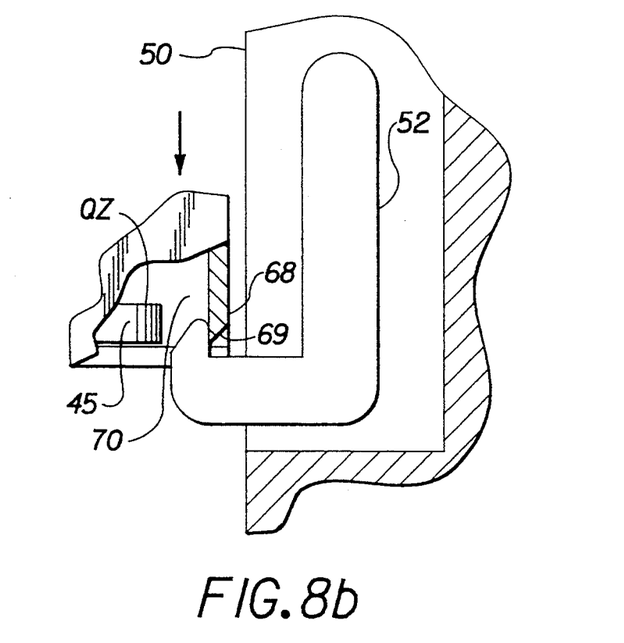
Figure 9A:
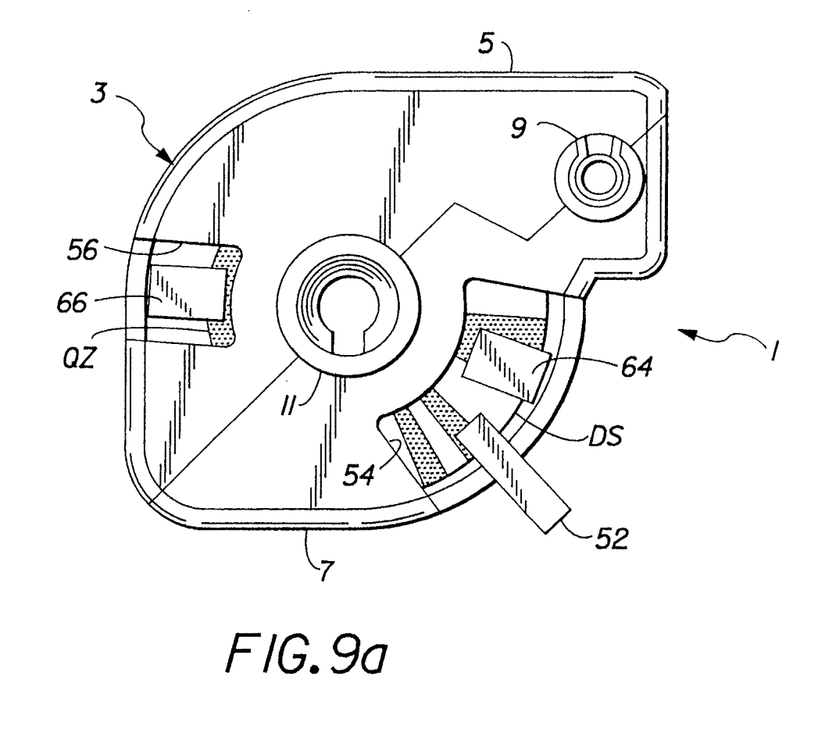
FIGS. 9a and 9b are end views of the assembled cassette illustrating the cooperation of the DEP hook with the radial bar coded disk for a cassette with unexposed film.
Figure 9B:
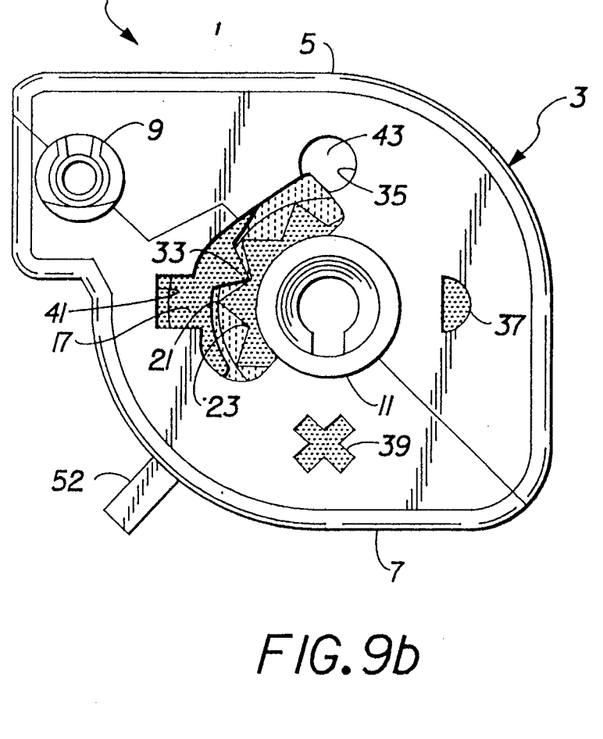

Considering now the operation of the invention, with reference jointly to FIGS. 8-10, when the cassette 1 is inserted into the cassette receiving chamber 50, the cassette engages the DEP hook in the area of cassette opening 54. In the case shown in FIG. 9 when the spool flag 43 is oriented to show via cut-out 35 that the film is unexposed (FIG. 9b), the radial bar coded disk 45 is rotationally positioned to block the opening 54 as shown in FIG. 8a. With continued insertion of the cassette, the DEP hook 52 is pivoted away from the cassette, clearing the lip portion 68, thereby allowing the cassette to be fully inserted into the receiving chamber 50. Preferably, although it is not essential, the lip portion 68 may be provided with a beveled surface 69 to facilitate sliding of the cassette past the pivoting DEP hook.

Figure 10A:
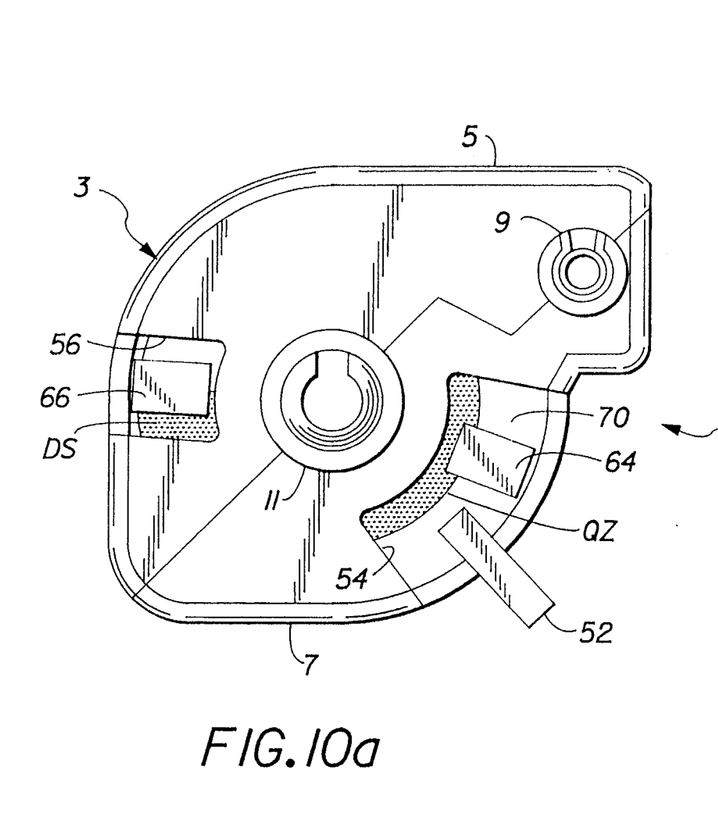
FIGS. 10a and 10b are end views of the assembled cassette illustrating the cooperation of the DEP hook with the notched portion of the radial bar coded disk for a cassette with exposed film.
Figure 10B:
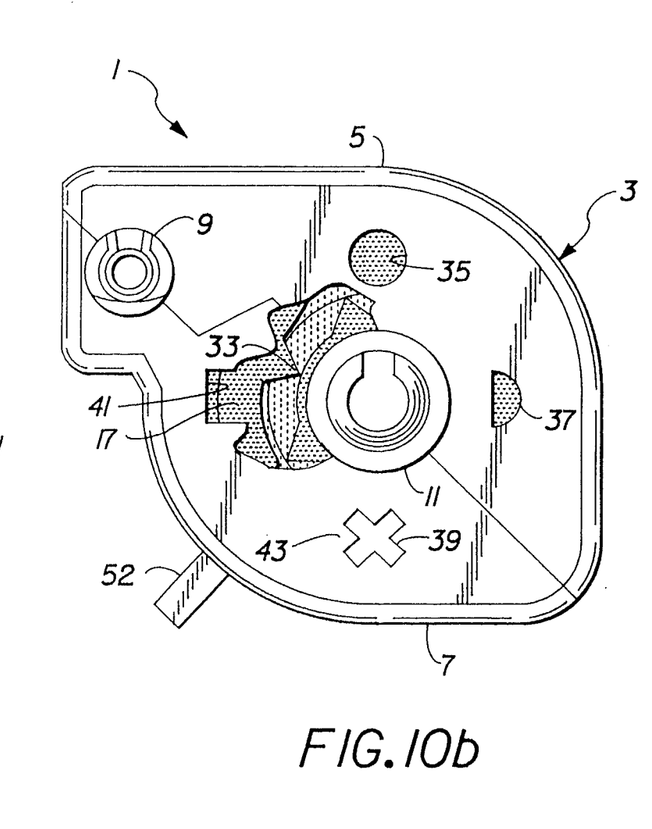

In FIGS. 10a, 10b, a cassette with exposed film is indicated by the icon cut-out 39. In this case, as seen in FIG. 10a and FIG. 8b, the radial bar coded disk 45 is rotationally positioned such that gap 70 between the disk segment QZ and the lip portion 68 is presented to the DEP hook 52 as the cassette is attempted to be inserted into the receiving chamber 50. When the cassette engages the hook, the tip of the hook enters the gap and the hook is restrained from pivoting by virtue of being captured by the lip portion 68 of the cassette. Consequently, it is apparent that a simple and convenient mechanism is provided that prevents an exposed film cassette from being inserted into the camera thereby preventing double exposure of the film.

The invention has been described with reference to a preferred embodiment. However, it will be appreciated that variations and modifications can be effected by persons of ordinary skill in the art without departing from the scope of the invention. For example, while the invention has been described in its preferred embodiment in which the bar code disk and DEP section is located at the drive end of the cassette, it is possible that the camera drive can be located to engage the end of the cassette opposite to the bar-code-disk/DEP end of the cassette. Moreover, the portion of the disk which is notched to define the gap 70 is preferably shown as the synchronizing segment QZ, other portions of the disk may be selected for this purpose.

In the accompanying drawings, the following reference numerals are used:

1. film cassette
3. cassette shell
5 & 7. shell halves
9. light-shielding door
11. film spool
13. filmstrip
15. spool core
17. spool lock
19. covering label
21. spool teeth
23. inter dental spaces
25 & 27. spool disks
29. trailing film end
31. camming means of door
33. detent of spool lock
35, 37, 39, & 41. four icon cut-outs
43. flag
45. bar-coded disk
47. central opening
49. bar coded label
50. cassette receiving chamber
51. chamber housing
52. DEP hook
54. cassette opto-sensor and hook opening
56. cassette opto-sensor opening
60 & 62. chamber openings for opto-sensors
64 & 66. opto-sensors
68. lip portion on cassette housing
69. beveled surface on lip portion 68
70. gap between disk segment QZ and lip portion 68

What is claimed is:

1. A photographic film cassette comprising a light tight housing, a rotatable film spool, the spool having a radial bar coded disk mounted thereon for rotation with the spool, the cassette characterized by:

the housing having a circumferential lip portion at the radial bar coded disk end of the spool adapted for engagement with a mechanical double exposure prevention hook in the cassette receiving chamber of a camera as the cassette is loaded endwise into the camera; and the radial bar coded disk having a first arcuate segment extending to the circumferential lip portion to inhibit engagement of the hook with the lip portion of the cassette housing when the disk is rotationally positioned to indicate that film in the cassette is unexposed and having a second arcuate segment extending part way to the lip portion to define a gap between the disk and the lip portion thereby to allow the hook to engage the lip portion when the disk is rotationally positioned to indicate that at least some of the film in the cassette is exposed.

2. The cassette of claim 1 wherein the first arcuate segment of the disk comprises a radial bar coded data segment providing data concerning characteristics of film in the cassette.

3. The cassette of claim 1 wherein the second arcuate segment of the disk comprises an extended synchronizing segment of the disk.

4. The cassette of claim i wherein the radial bar coded disc is mounted on the drive end of the film spool.

* * * * *